C. B. SHELDON.
Furniture-Casters.

No. 154,421.

Patented Aug. 25, 1874.

WITNESSES:
A Bennerkendorf
O Sedgwick

INVENTOR:
C. B. Sheldon
BY
Munn & Co
ATTORNEYS.

UNITED STATES PATENT OFFICE.

CEVEDRA B. SHELDON, OF NEW YORK, N. Y.

IMPROVEMENT IN FURNITURE-CASTERS.

Specification forming part of Letters Patent No. 154,421, dated August 25, 1874; application filed August 1, 1874.

CASE M.

*To all whom it may concern:*

Be it known that I, CEVEDRA B. SHELDON, of the city, county, and State of New York, have invented a new and Improved Furniture-Caster, of which the following is a specification:

This invention relates to the construction of the socket for fitting in the furniture-leg to receive the spindle of the caster-wheel. It is more particularly designed for those casters in which anti-friction balls are used between the top of the caster and the leg for lessening the friction of the wheel-spindle in turning about in the leg, but it is applicable to others not having such balls. It consists of the lower part of the socket, particularly the flange or collar which fits against the furniture-leg, and having the chamber or channel for the anti-friction balls, when they are used, formed of a disk of sheet metal stamped or pressed in the shape required, and the upper portion formed of a plate of wrought or rolled metal bent up in the form of a tube, and connected to the disk or collar, said socket to be used instead of the ordinary cast-metal sockets, when deeper ones are required than can well be made in one piece of sheet metal by stamping or pressing the flange or collar and the socket in one.

Figure 1:
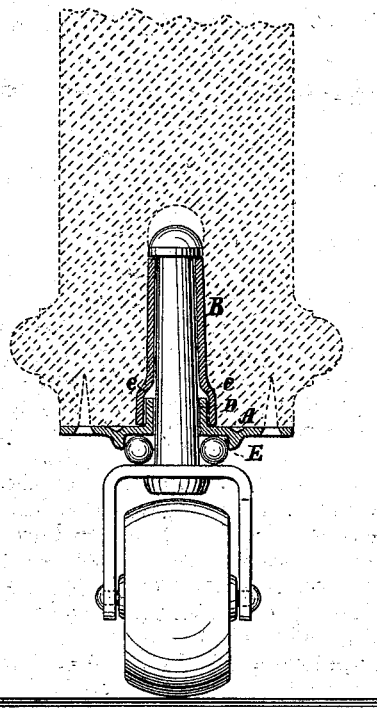
Figure 2:
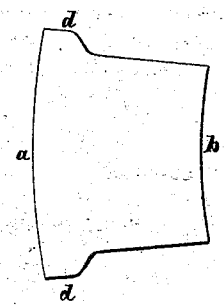

Figure 1 is a sectional elevation of a caster whereof the socket is contrived according to my invention, and Fig. 2 is a diagram of the plate of which the upper part of the socket is formed.

Similar letters of reference indicate corresponding parts.

A is the collar or flange forming the bottom part of the socket, and B is the tube forming the upper part. The bottom consists of a disk of sheet or rolled metal, with a large central perforation for the spindle C of the caster to pass through, and in this case it has a little collar or flange, D, extending upward from the center, as a means of attaching or connecting the part B, but it may be made without said flange. The collar is stamped or pressed into shape by means of dies, and, when the anti-friction balls E are used, will have the annular chamber F formed in it to receive them; but when they are not used this will not be necessary. The part B is made of a plate of metal, which is first cut in the form required to produce the socket of the form wanted, and then bent or rolled into cylindrical form. If the spindle for which the socket is to be made is tapered the plate will be correspondingly tapered, the lower end convex, and the upper end concave, as shown at $a$ and $b$; and if it is to be connected to the bottom part by fitting over the flange or collar D, the lower end will be enlarged or widened, as at $d$, and, when rolled up, it will be done so as to make an offset, $e$, of the depth of the collar D.

But I do not limit myself to this mode of connecting the two parts together, for the upper one may be fitted in the hole of the lower one, and they may be bound together by friction or soldered.

Having thus described my invention, I claim as new and desire to secure by Letters Patent—

A socket for the spindle of a caster, composed of a stamped plate or disk, A, for the bottom of the leg, and a bent or rolled tube, B, of sheet metal for the hole in the leg, combined substantially as specified.

CEVEDRA B. SHELDON.

Witnesses:
T. B. MOSHER,
ALEX. F. ROBERTS.